United States Patent [19]

Reynolds

[11] Patent Number: 4,829,856
[45] Date of Patent: May 16, 1989

[54] WRENCH-JACK ADAPTER TO LOOSEN WHEEL NUTS

[75] Inventor: Michael G. Reynolds, Utica, Mich.

[73] Assignee: General Motors Corporation, Detroit, Mich.

[21] Appl. No.: 211,785

[22] Filed: Jun. 27, 1988

[51] Int. Cl.$^4$ .............................................. B25B 13/00
[52] U.S. Cl. ........................................ 81/52; 81/180.1;
81/462; 254/133 R
[58] Field of Search .................... 81/52, 177.5, 180.1,
81/462; 254/122, 126, 133 R, DIG. 4

[56] References Cited

U.S. PATENT DOCUMENTS 4,070,931  1/1978  Florko, Jr. ................... 81/180.1 X
4,558,848  12/1985  Rutter ......................... 254/133 R X Primary Examiner—James G. Smith
Attorney, Agent, or Firm—William A. Schuetz

[57] ABSTRACT

A coupling device which can be readily attached to a vehicle lifting jack and connected with a wheel nut to loosen the latter in response to operation of the jack. The coupling device comprises an adapter housing which is adapted to be slidably received over a vehicle engaging end portion of the lifting jack, a bushing means having an opening therethrough, a pivot means for pivotally connecting said bushing to said adapter housing, and a wrench having a socket engaging end portion adapted to be fitted over a wheel nut and a handle portion which is slidably received in said opening in said bushing. Operation of the jack causes the vehicle engaging end portion thereof to be moved to cause the handle to be rotated to loosen the wheel nut.

8 Claims, 2 Drawing Sheets

WRENCH-JACK ADAPTER TO LOOSEN WHEEL NUTS

The present invention relates to an apparatus for loosening tight wheel nuts for holding a wheel onto an automotive vehicle and, more particularly, to a coupling device which can be readily attached to a vehicle lifting jack and connected with a wheel nut to loosen the same in response to operation of the lifting jack.

Automobile wheels are usually bolted onto a vehicle by studs attached to a brake disc or drum and wheel nuts on the outside of the wheel. Normal recommended tightening torques for the wheel nuts are typically 80-100 foot pounds. However, it can often require torques far in excess of the normal recommended tightening torques in order to loosen the wheel nuts, due to over-tightening, such as from an air impact wrench, thermal expansion and contraction or from corrosion of the stud and wheel nut. If a driver of a vehicle experiences a flat tire and tries to change the wheel and tire, it may be difficult or impossible for some drivers to apply sufficient torque to initially loosen the wheel nuts. However, once the wheel nuts are rotated slightly or "broken loose" from their initial position, the torque required to rotate the nuts further decreases dramatically and the driver may remove the wheel nut with much less difficulty.

Standard equipment provided in virtually all vehicles include a spare wheel and tire, a lifting jack and a wheel nut wrench. Wheel nut wrenches include a socket portion which can be positioned over a wheel nut and a handle portion to enable the socket portion to be rotated. These wrenches allow a force provided by a person to be translated into a torque to loosen or tighten the wheel nuts. A lifting jack provides a mechanical advantage so that a person can provide sufficient force to lift the vehicle so that a wheel having a flat tire can be removed. While such wheel nut wrenches and lifting jacks have been highly successful in operation, a problem can nevertheless exist if the person operating the wheel nut wrench does not have sufficient strength to loosen the wheel nuts.

Accordingly, the present invention provides a novel coupling device which can be readily attached to a vehicle lifting jack and connected with a wheel nut to loosen the same in response to operation of the lifting jack. This device takes advantage of the mechanical advantage of the lifting jack so that the wheel nut can be readily loosened.

An important object of the present invention is to provide a new and improved coupling device which can be readily attached to a vehicle lifting jack and connected with a wheel nut for readily loosening the latter in response to operation of the lifting jack.

Another object of the present invention is to provide a new and improved coupling device, as defined in the preceding object, and in which the coupling device includes an adapter housing having an opening therein for slidably receiving a vehicle engaging end portion of a lifting jack, a bushing or ring having an opening therethrough which is pivotally connected to the adapter housing and a wheel nut wrench having a socket means at one end for non-rotatably engaging a wheel nut and handle slidably received through the opening in the bushing, and in which the adapter housing and bushing cause the handle of the wrench to be rotated to loosen the wheel nut in response to the jack being operated to move its vehicle engaging end portion thereof in a direction to cause the handle to be rotated in a wheel nut loosening direction.

A further object of the present invention is to provide a new and improved coupling device, as defined in the next preceding object, and in which the adapter housing includes a stop adjacent one end for engaging the vehicle engaging end portion of the lifting jack to properly position the adapter housing on the jack.

Yet another object of the present invention is to provide a new and improved coupling device, as defined in the next preceding object, and in which the adapter housing is stamped from sheet metal and has an opening therein which is shaped complementary with the cross sectional shape of the vehicle engaging end portion of the lifting jack.

The present invention further resides in various novel constructions and arrangement of parts, and further objects, novel characteristics and advantages of the present invention will be apparent to those skilled in the art to which it relates and from the following detailed description of the illustrated, preferred embodiment thereof made with reference to the accompanying drawings forming a part of this specification and in which similar reference numerals are employed to designate corresponding parts throughout the several views, and in which.

Figure 1:
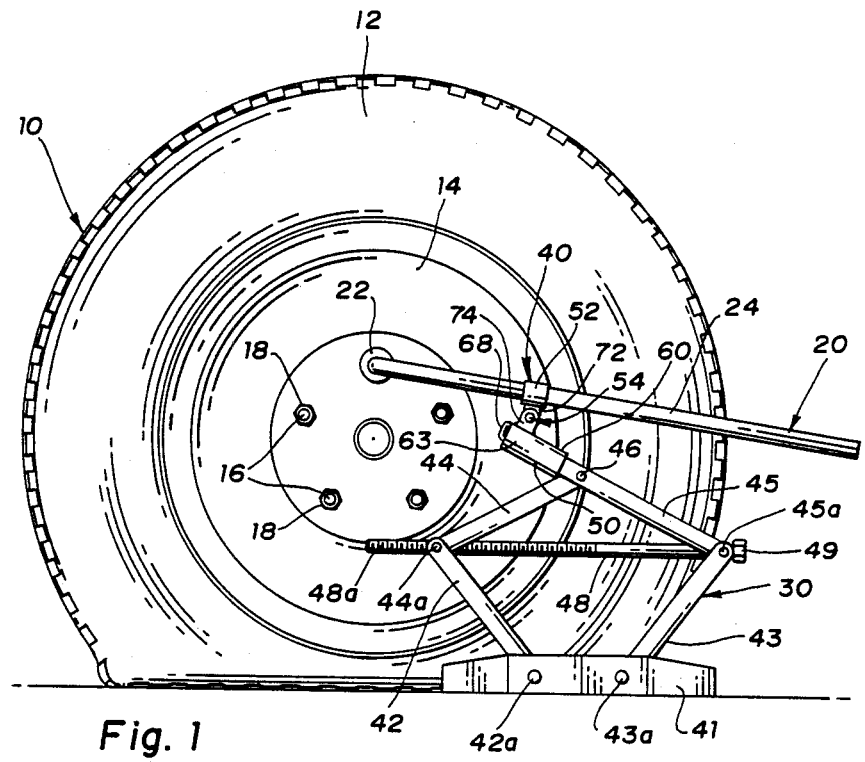
FIG. 1 is a side elevational view of a vehicle wheel, a lifting jack and the novel coupling device of the present invention and showing the same attached to the vehicle jack and a wheel nut.

Referring to FIG. 1 of the drawings, a vehicle wheel 10 is thereshown. The wheel 10 comprises an outer rubber tire 12 which is secured to a metal wheel rim 14. The wheel 10 is adapted to be bolted and secured to a brake disc or brake drum (not shown) of an automotive vehicle via studs 16 carried by brake disc or drum and which extend through aligned openings in the rim 14 of the wheel 10. The rim 14 is bolted to the brake disc or drum by wheel nuts 18 which are threadably connected onto the bolts 16 and tightened to secure the wheel 10 to the automotive vehicle.

As shown in FIG. 1, when the tire 12 goes flat, it becomes necessary to remove the wheel 10 from the vehicle and replace it with the spare wheel and tire. The normal procedure for removing and replacing a wheel 10 on an automotive vehicle is to use a wheel nut wrench 20 to loosen the wheel nuts 18. The wheel nut wrench includes a socket engaging end portion 22 which slidably fits over the wheel nuts 18, which are usually hex nuts having six sides, and a handle portion 24 extending transversely of or normal to the socket portion 22. By placing the socket portion 22 over the wheel nuts 18 and turning the handle 24 in a nut loosening direction, a torque is applied to the wheel nuts 18 to allow the same to be loosened. Once the wheel nuts 18 are loosened, a vehicle lifting jack 30 having an upper vehicle engaging end portion 32 is moved into position adjacent the vehicle and then operated to cause the end portion 32 to engage the underside of the frame and raise the vehicle to a position such that the wheel 10 can be removed from the associated brake disc or drum and replaced by a spare wheel. Thereafter the jack can be operated to lower the vehicle.

However, in some cases when a tire goes flat, it is very difficult for some operators to loosen the wheel nuts 18 by the wrench 20 because insufficient torque is applied to the handle 20, either because the person lacks the strength to impart the necessary torque or because the wheel nuts 18 have been over-tightened to the point where a loosening torque in excess of what can be applied by many persons would be required.

Accordingly, the present invention provides a novel coupling device 40 for coupling a wrench, such as the wheel nut wrench 20, which is connected with the wheel nut 18 to a lifting jack, such as the lifting jack 30 in order to take advantage of the mechanical advantage obtainable with the lifting jack to rotate the wrench handle 24 so as to enable the wheel nuts 18 to be readily loosened.

The lifting jack 30 could be of any suitable or convention construction, but is shown for illustrative purposes in FIG. 1 as being a conventional scissors type jack. The scissors type jack 30 would have a base 41 which is adapted to engage a ground surface, a pair of spaced lower links 42 and 43 which are pivotally connected at their lower ends via pivots 42a and 43a to the base 41 and a pair of upper links 44 and 45 having their lower ends pivotally connected with the upper ends of the lower links 42 and 43 via pivot means 44a and 45a, respectively. The upper links 44 and 45 would also be pivotally connected together via a pivot 46 and with the link 45 having a vehicle engaging end portion 32. The vehicle engaging end portion 32 would have a projection 47 which would normally be receivable within a slot or opening on the underside of the frame (not shown) of the vehicle. The scissors jack 30 would also include an operating screw 48 having a threaded portion 48a which would be threadably engaged with a bearing nut (not shown) formed integral with the pivot means 44a and disposed between the links 42 and 44. The screw 48 would also be rotatably received in a bearing (not shown) formed integral with the pivot means 45a and disposed between the links 43 and 45. The screw would have a hex head 49 thereon for engagement with a suitable wrench to enable the same to be rotated. Rotation of the screw 48 would cause the pivots 44a and 45a to be moved toward and away from each other, depending on the direction of rotation of the screw 48, to cause the end portion 32 to be raised and lowered.

Figure 2:
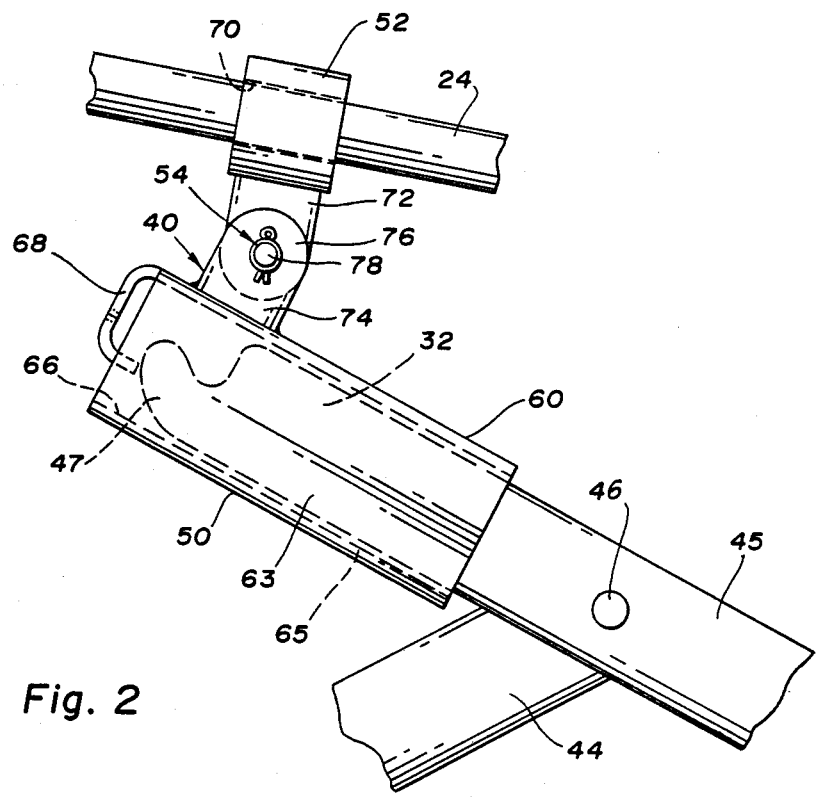
FIG. 2 is an enlarged fragmentary side elevational view of the novel coupling device of the present invention.
Figure 4:
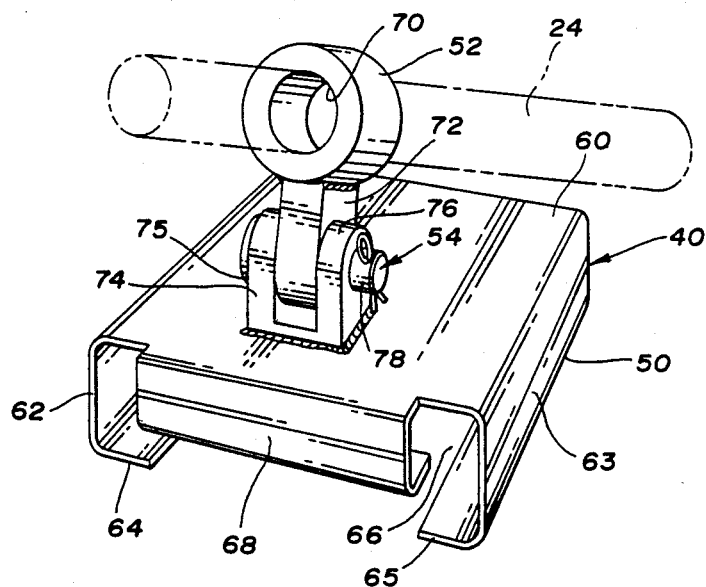
FIG. 4 is a perspective view of part of the novel coupling device of the present invention.

As best shown in FIGS. 2 and 4, the novel coupling device 40 comprises, in general, an adapter housing 50 which is adapted to slidably receive the vehicle engaging end portion 32 of the scissors jack 30, a bushing or ring 52 which is adapted to slidably receive a handle 24 of a wrench 20, such as the wheel nut engaging wrench 20, and a pivot means 54 for pivotally connecting the adapter 50 to the ring 52. The adapter 50 is stamped from suitable sheet metal or steel to the configuration shown in FIG. 4. It is hereshown as being of a generally rectangular cross sectional shape and has a top 60, left and right sides 62 and 63 extending perpendicular to the top 60 and bottom side portions 64 and 65 extending generally perpendicular to the sides 62 and 63, respectively. The top 60, sides 62 and 63 and bottom portions 64 and 65 define a generally rectangularly shaped opening 66, which opening is shaped complementary with the vehicle engaging end portion 32 of the scissors jack 30. In addition, the adapter housing 50 at its left end, as viewed in FIG. 2, has a transversely and inwardly bent end 68 which functions as a stop for engaging the vehicle engaging end portion 32 of the scissors jack 30. The adapter is adapted to be slidably positioned over the end portion 32 of the scissors jack 30 until the projection 47 on the end portion 32 engages the stop 68. Since the adapter is generally rectangular and is shaped complementary with the end portion 32, it is non-rotatable relative to the end portion 32 and can be easily and readily slid onto the end portion 32.

The bushing or ring 52 is made from steel and has a central through opening 70 through which the handle 24 of a wrench 20 can be slidably received. The bushing or ring 52 includes a downwardly projecting ear which is welded to the bushing 52. The ear 72 has a central opening therein which is aligned with openings in a U-shaped member 74, which is suitably welded to the top side 60 of the adapter housing 50. The U-shape member includes a pair of upwardly extending ears 75 and 76 which straddle the ear 72 on the bushing 52 and which is pivotally connected to the ear 72 of the bushing 52 by a pivot pin 78. The ears 72, 75, 76 and the pivot pin 78 comprise the pivot means 54.

Figure 3:
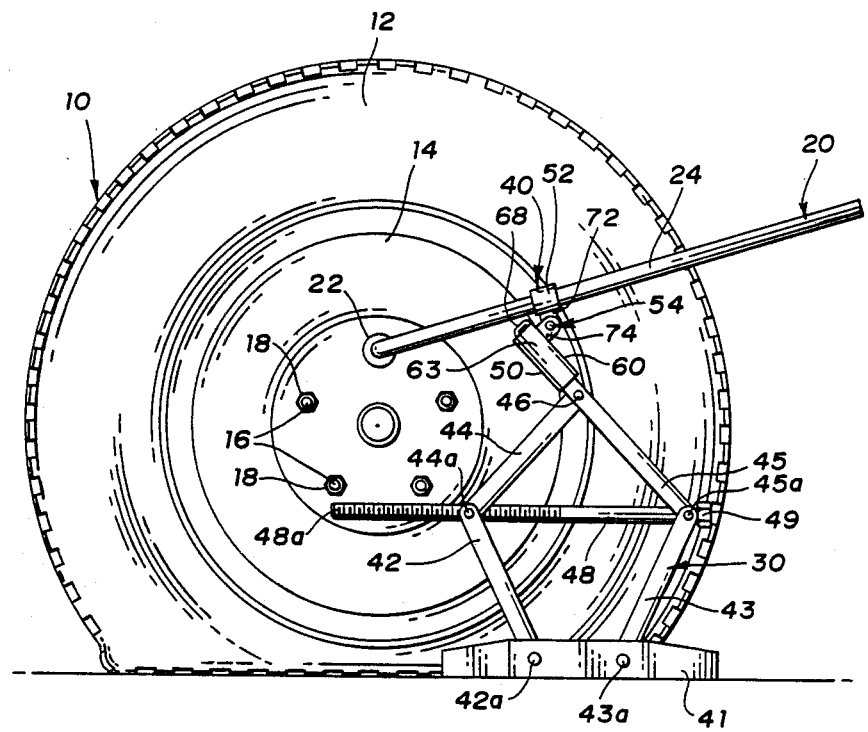
FIG. 3 is a view like that shown in FIG. 1, but showing different parts thereof in different positions.

The operation of the novel coupling device 40 will now be described. When the vehicle experiences a flat tire, the operator will position the jack 30 adjacent to the wheel nuts 18, as shown in FIG. 1. The operator will then slide the adapter 50 over the end portion 32 of the jack 30 until the stop 68 on the adapter 50 engages the projection 47 on the jack 30. The operator will then insert the handle 24 of the wrench 20 through the opening 70 in the bushing 52 and position the socket engaging end portion of the wrench over a wheel nut 18. As shown in FIG. 1, the wrench 20 is positioned over the topmost wheel nut 18 and with the handle forming an acute included angle with the ground. The operator will then take a second wrench or tool and rotate the screw 48 of the lift jack 30 to cause the end portion 32 of the jack to be raised. As the jack is being raised, the handle 24 will rotated in a counterclockwise direction approximately 30–60 degrees to loosen the wheel nut, as shown in FIG. 3. When the wheel nut 18 is loosened, the operator will remove the socket engaging end of the wrench by grasping the wrench 20 and the jack 30 and moving it away from the wheel 10. It will then reposition the jack 30 and wrench 20 onto the next wheel nut 18 and repeat the operation until all the wheel nuts 18 are loosened. Thereafter, the operator can remove the coupling device and use the jack in a normal manner to raise the vehicle to enable the tire 12 and the wheel 10 to be removed.

It should be noted that it will be necessary for the operator to raise and lower the jack 30 so that the socket engaging end of the wrench 20 can engage the hex wheel nut 18. The socket engaging portion 22 of the wrench 20 is preferably a twelve notch socket so that twelve different rotational positions of the wrench can be used to connect the wrench 20 with the wheel nuts 18. It has also been found that best results are achieved when loosening the wheel nuts if the initially starting position of the wrench handle 24 formed an acute included angle of approximately 20° with the horizontal ground. It should also be noted that, as shown in FIG. 1, the wheel nuts 18 are loosened by rotating the handle 24 in a counterclockwise direction, that for other wheels it may be necessary to rotate the handle in a clockwise direction to effect loosening of the wheel nuts 18. Moreover, the wheel nuts 18 can be loosened by either raising the handle when the jack is positioned to the right of a vertical plane passing through the center of the wheel 10 or can be loosened by pulling down on the handle when the jack is located to the left of a vertical plane passing through the center of the wheel 10.

From the foregoing, it should be readily apparent that a novel coupling device has been provided in order to enable to wheel nuts on a wheel of an automotive vehicle to be readily loosened by use of a conventional jack. It should also be readily apparent that the coupling device is of a relatively simple and economical construction and is highly effective in operation.

Although the illustrated embodiment thereof has been described in great detail, it should be apparent that certain modifications, changes and adaptations may be made in the illustrated embodiment, and that it is intended to cover all such modifications, changes and adaptations which come within the spirit of the present invention.

The embodiments of the invention in which an exclusive property or privilege is claimed are defined as follows:

1. A wheel nut loosening device for use with a vehicle lifting jack having a vehicle engaging end portion which can be raised and lowered comprising:

an adapter housing having an opening therein for slidably receiving said vehicle engaging end portion of said jack, a stop on said housing adjacent one end thereof for engaging said vehicle engaging end portion of said jack to position the adapter on said jack, a bushing having an opening therethrough, pivot means for pivotally connecting said bushing to said adapter housing, a wrench having a socket means at one end for non-rotatably engaging a wheel nut and a handle slidably received through said opening in said bushing, said adapter housing and bushing causing said handle of said wrench to be rotated to loosen said wheel nut in response to said jack being operated to move said vehicle engaging end portion thereof while a wheel of the vehicle is in a ground engaging position.

2. In combination, a vehicle lifting jack having a vehicle engaging end portion which can be raised and lowered in response to operation of said lifting jack in opposite directions and a coupling device for loosening a wheel nut which holds a wheel onto a vehicle and which can be readily attached to and detached from said vehicle engaging end portion of said jack, said coupling device comprising:

an adapter housing having an opening therein for slidably receiving said vehicle engaging end portion of said jack, a stop means on said adapter for engaging said vehicle engaging end portion of said jack to position the adapter on said jack, a bushing having an opening therethrough, pivot means for pivotally connecting said bushing to said adapter housing, a wrench having a socket means at one end for non-rotatably engaging a wheel nut for mounting a wheel onto a vehicle, said wrench having a handle which slidably extends through said opening in said bushing, said adapter housing and bushing causing said wrench to be rotated to loosen the wheel nut in response to being moved in a nut loosening direction when the jack is operated to move the vehicle engaging end portion while the wheel is in a ground engaging position.

3. In combination, as defined in claim 2, and wherein said adapter is stamped from sheet metal.

4. In combination, as defined in claim 3, and wherein said opening in said adapter is shaped complementary with the cross sectional shape of said vehicle engaging end portion of said jack.

5. In combination, as defined in claim 4, and wherein said vehicle engaging end portion and said opening in said adapter housing are non-circular in shape.

6. In combination, as defined in claim 5, and wherein said stop comprises a transversely extending tang partially covering said opening at one end thereof.

7. A device, as defined in claim 1, and wherein said adapter is stamped from sheet metal and said stop comprises a transversely bent tang covering part of said opening in said adapter at one end thereof.

8. A device, as defined in claim 7, and wherein said opening in said adapter and the cross sectional shape of said vehicle engaging end portion are non-circular in shape.

* * * * *